United States Patent
Chen et al.

(10) Patent No.: US 7,814,558 B2
(45) Date of Patent: Oct. 12, 2010

(54) DYNAMIC DISCOVERY AND DATABASE PASSWORD EXPIRATION MANAGEMENT

(75) Inventors: Yen-Fu Chen, Austin, TX (US); Chris Guo Lee, Tucson, AZ (US); Anmol Neelammna Matada, Austin, TX (US); Adeel Omer, Austin, TX (US); Ningning Wang, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 12/049,297

(22) Filed: Mar. 15, 2008

(65) Prior Publication Data
US 2008/0313727 A1 Dec. 18, 2008

Related U.S. Application Data

(63) Continuation of application No. 11/372,324, filed on Mar. 9, 2006, now abandoned.

(51) Int. Cl.
*G06F 7/04* (2006.01)
*G06F 21/00* (2006.01)
*H04L 29/06* (2006.01)

(52) U.S. Cl. .............................. 726/27; 726/4; 726/21; 726/28; 726/29; 713/166; 713/182

(58) Field of Classification Search ........................ None
See application file for complete search history.

(56) References Cited

U.S. PATENT DOCUMENTS 6,249,868 B1  6/2001  Sherman et al. ............. 713/168
6,341,352 B1  1/2002  Child et al. .................. 713/201
6,826,700 B1  11/2004 Germscheid et al. ........ 713/202
7,096,203 B2 * 8/2006  Pence et al. .................... 705/59

OTHER PUBLICATIONS

Hodes, et al., "Composable ad-hoc mobile services for universal interaction," MOBICOM 97, Budapest Hungary, ACM, Aug. 2, 1997 (12 pages).
Jing, et al., "Client-server computing in mobile environments," ACM Computing Surveys, vol. 31, No. 2, Jun. 1999, (p. 117-157).
Piero Fraternali, "Tools and approaches for developing data-intensive web applications: a survey," ACM Computing Surveys, vol. 31, No. 3, Sep. 1999 (p. 227-263).
Gao et al., "Application specific data replication for edge servers," WWW2003, May 20-24, 2003, Budapest Hingary, ACM 1-58113-680-3/03/0005 (p. 449-460).

* cited by examiner

*Primary Examiner*—Kaveh Abrishamkar
(74) *Attorney, Agent, or Firm*—VanLeeuwen & VanLeeuwen; Justin M. Dillon (57) ABSTRACT

An approach that proactively manages login security data is provided. The system selects requesters of a software application resource. A privileged requester is used to request login security data pertaining to the selected requesters. The login security data that is received is compared to one or more parameters that indicate which action(s) should take place. Based on this comparison, one or more actions are taken on behalf of the selected requesters. One of the actions that can be taken is a grace period. One of the actions that can be taken is an automatic security setting update. Another action that can be taken is an automatic notification that automatically informs a user or application that a requestor's access to the resource is about to expire.

18 Claims, 6 Drawing Sheets

DYNAMIC DISCOVERY AND DATABASE PASSWORD EXPIRATION MANAGEMENT

RELATED APPLICATIONS

This application is a continuation application of U.S. Non-Provisional patent application Ser. No. 11/372,324, entitled "System and Method for Dynamic Discovery and Database Password Expiration Management," filed on Mar. 9, 2006 now abandoned.

BACKGROUND OF THE INVENTION

1. Technical Field

The present invention relates in general to a system and method for dynamically discovering access issues related to resources, such as databases. In particular, the present invention relates to a system and method for dynamically discovering and managing expired passwords used to access a resource, such as a database.

2. Description of the Related Art

User identifier and password management on complex systems, such as on a database management system (DBMS), pose challenges to organizations and administrators. While utilities are often available on these systems, the current technology is unable to accommodate complex situations often faced by organizations and administrators. Current utilities allow administrators to change passwords, import/export data (such as user information from a DBMS), provide certain levels of reporting, and various levels of tracking. For example, International Business Machines Corporation (IBM) offers a DB2™ database product that includes a password expiration maintenance utility (DB2PEM). This utility enables the administrator to change a user's DB2 password on MVS/ESA systems and provides features that address administration and security. Likewise, Microsoft offers a Baseline Security Analyzer™ (MBSA) that is a tool used to scan for common insecure configurations and provides recommendations with respect to restricting privilege levels Microsoft's SQL server services.

While current solutions are convenient and save administrators time by giving them some level of control from a centralized location, current solutions do not take software applications that access systems into account. Furthermore, current solutions cannot proactively scan applications that will be impacted by password expiration, inform the administrator that action is needed, nor provide automated resolution of the problem.

What is needed, therefore, is a system and method that dynamically discovers access issues before they arise. Furthermore, what is needed is a system and method that allows various actions to be performed when access to a resource is compromised.

SUMMARY

It has been discovered that the aforementioned challenges are resolved using a system and method that proactively manages login security data. The system selects requesters of a software application resource, such as a database management system (DBMS). Examples of requesters include users, other applications that access the resource, and software application servers. A privileged requester is used to request login security data pertaining to the selected requesters. The login security data that is received is compared to one or more parameters that indicate which action(s) should take place. Based on this comparison, one or more actions are taken on behalf of the selected requesters.

In one embodiment, one of the actions that can be taken is a grace period that allows the selected requester to continue to access the software application resource even after the requestor's password has expired. This is performed by a privileged requester receiving the requestor's requests and forwarding the requests on to the software application resource on behalf of the requester.

In another embodiment, the requesters are prioritized so that more important requesters are managed before less important requesters. In this manner, access issues that pertain to a highly important application are handled and resolved before access issues pertaining to a less important application.

In another embodiment, one of the actions that can be taken is an automatic security setting update where the privileged requester sends a security update request to the resource on behalf of the requester. For example, the privileged requester can request an update of the requestor's password, on behalf of the requester, before the password expires. In this manner, high-priority requesters, such as key applications that use a resource, will not fail or shutdown because of an inability to access the resource.

Finally, in one embodiment, one of the actions that can be taken is an automatic notification that automatically informs a user or application that a requestor's access to the resource is about to expire. In this embodiment, the notified requester may be different from the actual requester. In this manner, a user that manages a particular automated application can be informed that the automated application's access is about to expire.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1A:
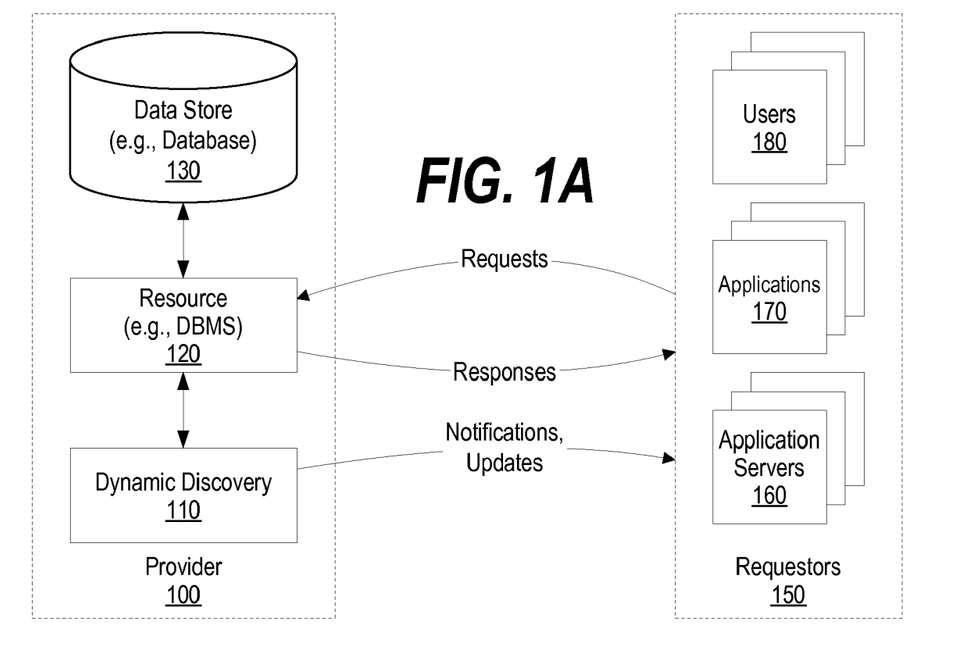
FIG. 1A is a diagram showing dynamic discovery working on behalf of a resource, such as a DBMS, to provide notices to resource requesters.

FIG. 1A is a diagram showing dynamic discovery working on behalf of a resource, such as a DBMS, to provide notices to resource requesters. Provider 100 includes dynamic discovery component 110, software application resource 120, and data store 130 accessed by the software application resource. For example, software application resource 120 could be a database management system (DBMS) and data store 130 could be the data managed by the DBMS. Dynamic discovery component 110 is a privileged requester of the software application resource and proactively manages requesters' access to the software application resource. Requestors 150 are shown as including application servers 160, applications 170, and individual users 180. In FIG. 1A, the requesters' requests are sent from the requester to software application resource 120 and the software application resource sends responses back to the requesters. In FIG. 1A, dynamic discovery component 110 plays a more passive role and monitors login security data pertaining to one or more of the requesters based on preset criteria. Dynamic discovery component 110 is shown providing notifications and updates to requesters. For example, the preset criteria may indicate that a particular requester wants to be notified five days before access to the software application resource is terminated. Another requester may want the dynamic discovery component to automatically update its password prior to the password being expired and send the requester a notification that the update was performed.

Figure 1B:
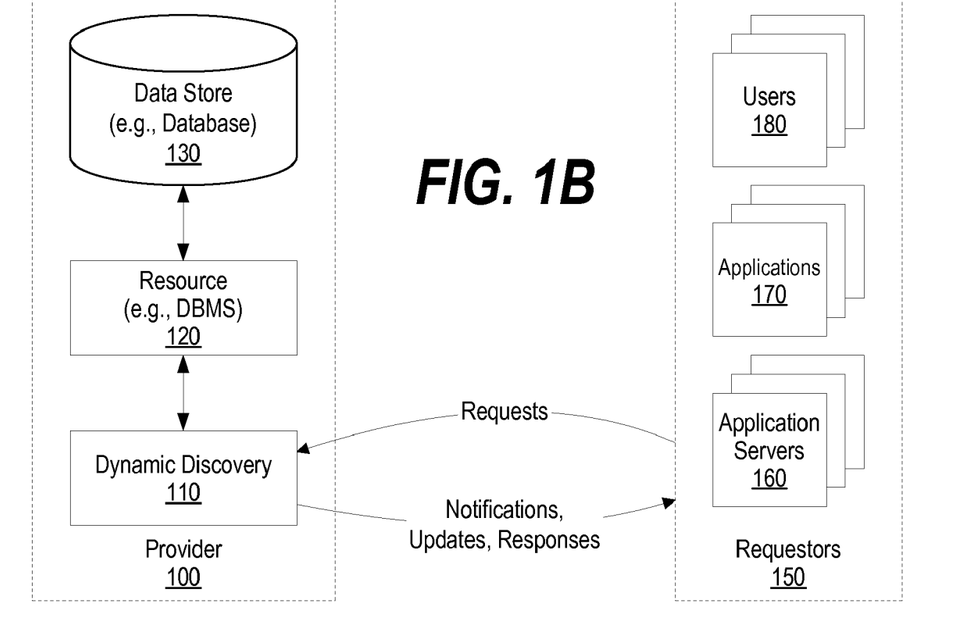
FIG. 1B is a diagram showing dynamic discovery receiving requests on behalf of a resource, such as a DBMS, and returning results to the resource requesters.

FIG. 1B is a diagram showing dynamic discovery receiving requests on behalf of a resource, such as a DBMS, and returning results to the resource requesters. In contrast to FIG. 1A, the dynamic discovery component in FIG. 1B plays a more dynamic role. In FIG. 1B, requesters' requests are sent to dynamic discovery component 110 and these requests are forwarded, by the dynamic discovery component, to software application resource 120 on behalf of the requester. In this manner, a requester whose password has expired can continue to use the software application resource during a "grace period." This is accomplished because the dynamic discovery component, being a privileged requester, is able to submit requests to the software application resource on behalf of the requester even after the requestor's access has been terminated due to an expired password.

Figure 2:
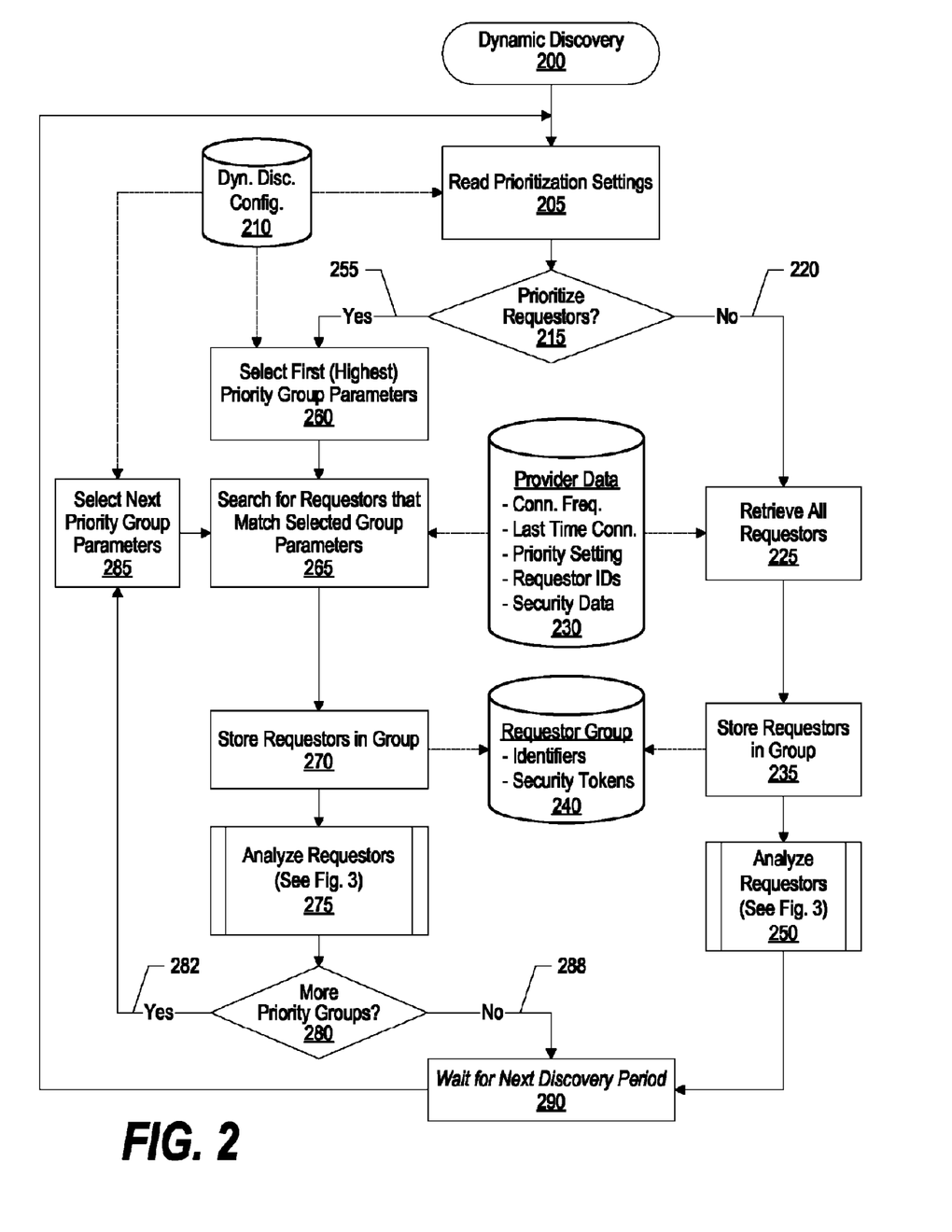
FIG. 2 is a flowchart showing steps taken by the dynamic discovery component to select requesters, or groups of requesters, for analysis.

FIG. 2 is a flowchart showing steps taken by the dynamic discovery component to select requesters, or groups of requesters, for analysis. Dynamic discovery processing commences at 200 whereupon, at step 205, prioritization settings are read from dynamic discovery configuration file 210. Prioritization settings allow the system to handle more important (higher priority) requesters before handling less important (lower priority) requesters. In a system with hundreds or even thousands of requesters, prioritizing the requesters makes it more likely that access issues of high priority requesters will be handled before such requesters, such as important software applications, are impacted due to expired passwords or other security data issues.

A determination is made as to whether the requesters have been prioritized (decision 215). If the requesters have not been prioritized, then decision 215 branches to "no" branch 220. At step 225, the dynamic discovery component, being a privileged requester, receives security data pertaining to the users (data store 230). At step 235, the requesters are stored in a single group (data store 240). This group is analyzed in predefined process 250 (see FIG. 3 and corresponding text for processing details of predefined process 250). At step 290, processing waits for the next discovery period, at which point processing loops back to begin the process again.

Returning to decision 215, if the requesters have been prioritized, decision 215 branches to "yes" branch 255 whereupon, at step 260, parameters identifying the first (highest) priority group of requesters is selected from dynamic discovery configuration file 210. At step 265, the dynamic discovery component, being a privileged requester, receives security data pertaining to the users (data store 230). The parameters for a given priority group can be a single requester identifier or a parameter that allows the dynamic discovery component to query security data pertaining to a larger group from provider data 230. At step 265, the dynamic discovery component searches for requesters that match the priority group parameters. At step 270, the requesters that are included in the returned search data are stored in requester group data store 240. This group of highest priority requesters is analyzed in predefined process 275 (see FIG. 3 and corresponding text for processing details). A determination is made as to whether there are more priority groups to process (decision 280). If there are more priority groups that need to be processed, decision 280 branches to "yes" branch 282 whereupon, at step 285, the parameters pertaining to the next priority group parameters are retrieved. Processing then loops back to search the provider data for the next group of requesters and analyze the next group of requesters. This continues until all priority groups have been handled, at which point decision 280 branches to "no" branch 288 whereupon, at step 290, processing waits for the next discovery period before looping back to repeat the process.

Figure 3:
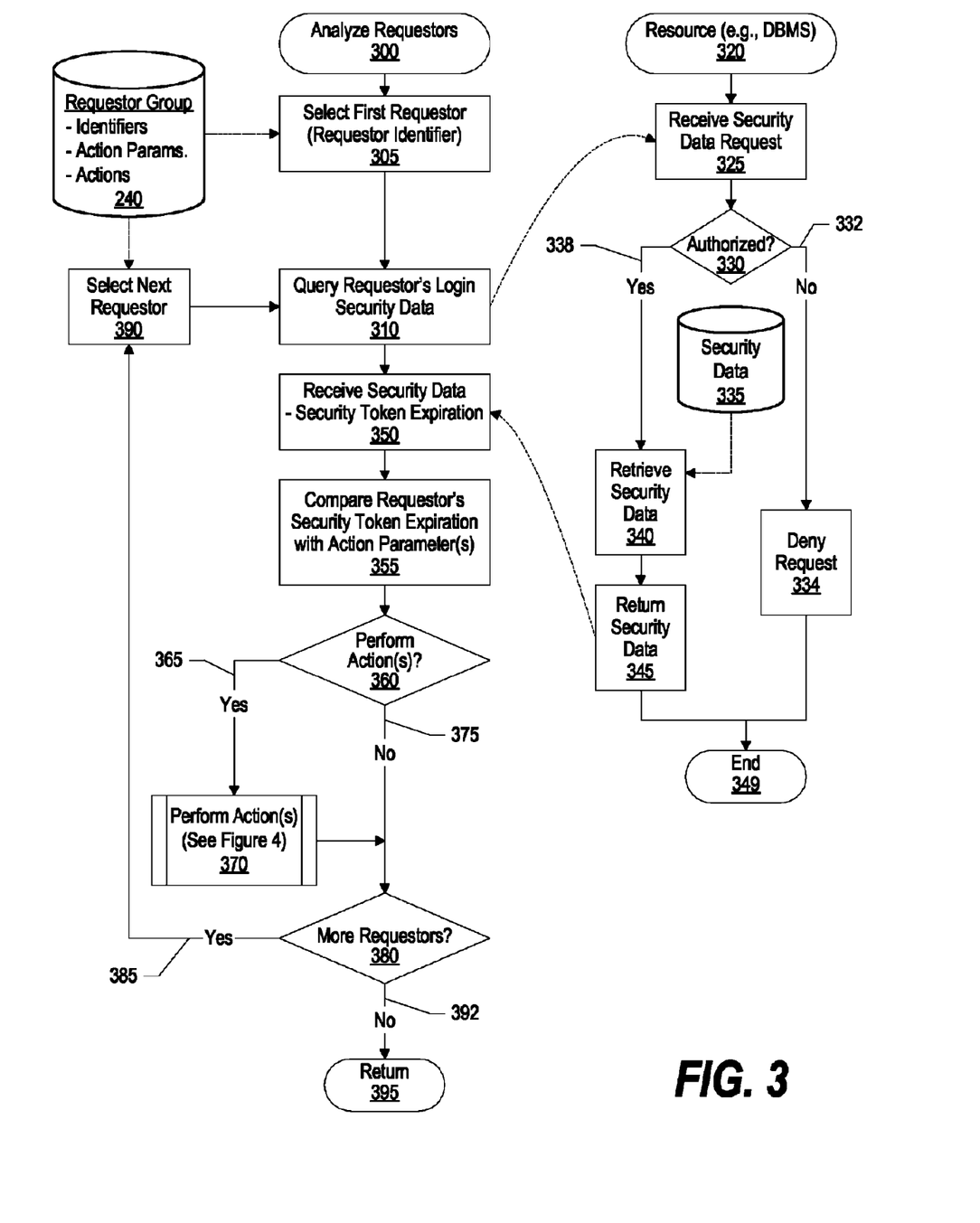
FIG. 3 is a flowchart showing steps taken by the dynamic discovery component to analyze the requesters that were selected in FIG. 2.

FIG. 3 is a flowchart showing steps taken by the dynamic discovery component to analyze the requesters that were selected in FIG. 2. Processing commences at 300 whereupon, at step 305, the first requester identifier is selected from requester group data store 240 (for details concerning the creation of requester group 240, see FIG. 2 and corresponding text for processing details). At step 310, the dynamic discovery component queries the selected requestor's login security data. Login security data, as used herein, includes the requester's password expiration data as well as any other login security data that could impact the requestor's ability to access the software application resource.

Software application resource processing, such as a database management system (DBMS), commences at 320 with receipt of the security data request from the dynamic discovery component. A determination is made as to whether the requester of the security data is authorized (decision 330). If the requester is not authorized, decision 330 branches to "no" branch 332 whereupon the request is denied at step 334 and processing of the request ends at 349. The dynamic discovery component is a privileged requester so its request for the data should be authorized, in which case decision 330 branches to "yes" branch 338 whereupon, at step 340, the requested security data is retrieved from security data store 335 and, at step 345, the retrieved security data is returned to the dynamic discovery component. Processing of the request thereafter ends at 349.

Returning to dynamic discovery component processing, at step 350, the security data (including security token (password) expiration) is received. At step 355, the requestor's received security token expiration data is compared with action parameter(s) included in data store 240. For example, one action parameter may request that the requester be notified five days prior to the expiration of the security token and another action parameter may request that a grace period of ten days be provided to a particular group of requesters (such as a high priority group). A determination is made as to whether, based on the comparison, any actions need to be performed for the selected requester (decision 360). If one or more actions need to be performed, decision 360 branches to "yes" branch 365 whereupon the actions are performed (predefined process 370, see FIG. 4 and corresponding text for processing details). On the other hand, if no actions need to be performed, decision 360 branches to "no" branch 375 bypassing predefined process 370.

A determination is made as to whether there are more requesters in the group that need to be processed (decision 380). If there are additional requesters in the group yet to be processed, decision 380 branches to "yes" branch 385 whereupon, at step 390 the next requester is selected from the group and processing loops back to analyze the newly selected requestor's security token expiration. This looping continues until all requesters in the group have been processed, at which point decision 380 branches to "no" branch 392 and processing returns to the calling routine (see FIG. 2) at 395.

Figure 4:
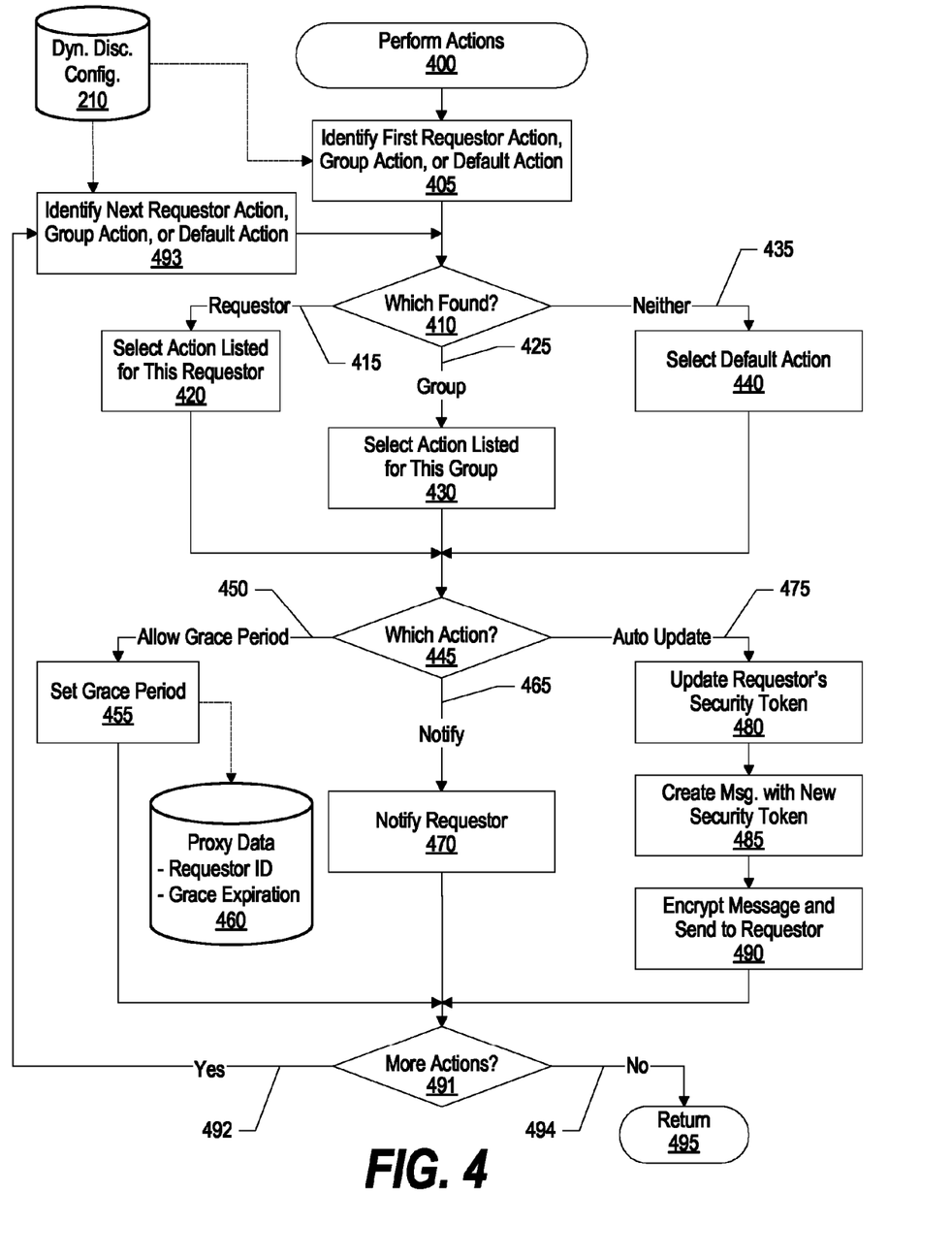
FIG. 4 is a flowchart showing steps taken to perform actions on behalf of requesters identified through the analysis steps of FIG. 3.

FIG. 4 is a flowchart showing steps taken to perform actions on behalf of requesters identified through the analysis steps of FIG. 3. Processing commences at 400 whereupon, at step 405, the action is retrieved from dynamic discovery configuration file 210. In one embodiment, a requester can be both individually identified and included in a group. For example, an action can be created for a group of requesters to send a notification to the requesters when the requesters' security tokens are due to expire in the next five days. However, for one of the requesters in this group, an action could be created to automatically update the requestor's security token on behalf of the requester. The actions can also indicate if group actions, individual actions, and default actions should be performed, or if some actions (e.g., an individual action) is performed in lieu of performing a group and/or default actions.

A determination is made regarding the type of action that was retrieved (decision 410). If a requester action was retrieved, decision 410 branches to branch 415 whereupon, at step 420, the action listed for the selected requester is selected (the requester being selected during the calling routine, see FIG. 3 and corresponding text for details). If a group action was identified in step 405, then decision 410 branches to branch 425 whereupon, at step 430, the action listed for the requestor's group is selected. Finally, if the action identified in step 405 is not directed at either the requester or the requestor's group, then the action is a default action and decision 410 branches to branch 435 whereupon, at step 440, the default action is selected.

A determination is made as to the type of action that was selected (decision 445). If the action is an action to allow the requester to have a grace period when the requestor's security token expires, then decision 445 branches to branch 450 whereupon, at step 455, a grace period is set for the requester and information pertaining to the grace period is stored in data store 460. This information includes the requestor's identifier and the grace period (e.g., number of days) that was set. If the action is to notify the requester, then decision 445 branches to branch 465 whereupon, at step 470, the requester is notified that the requestor's security token is about to expire. Finally, if the action is to automatically update the requestor's security token, then decision 445 branches to branch 475 whereupon, at step 480, the requestor's security token is updated by the dynamic discovery component on behalf of the requester, at step 485 a message is created with the new security token, and at step 490 the message is encrypted and sent to the requester notifying the requester of the updated security token.

A determination is made as to whether there are more actions (individual/group/default) to perform for the selected requester (decision 491). If there are more actions to perform, decision 491 branches to "yes" branch 492 whereupon, at step 493, the next requester action is identified and processing loops back to perform the next action. This looping continues until all actions for the requester have been performed, at which point decision 491 branches to "no" branch 494 and processing ends at 495.

Figure 5:
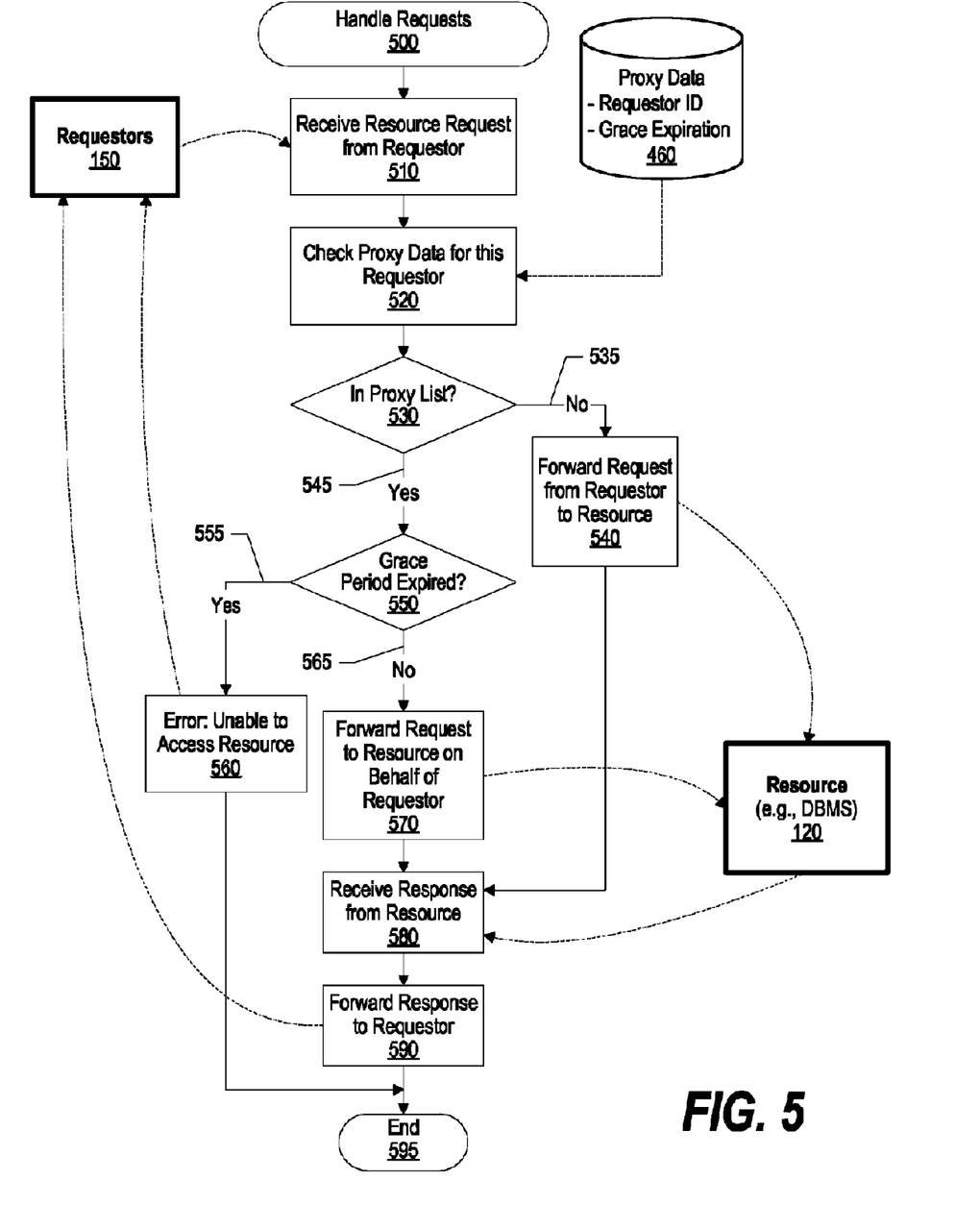
FIG. 5 is a flowchart showing steps taken by the dynamic discovery component to handle requests received from requesters.

FIG. 5 is a flowchart showing steps taken by the dynamic discovery component to handle requests received from requesters. Processing commences at 500 whereupon, at step 510, the dynamic discovery component receives a request from a requester (150) where the request pertains to a software application resource being managed by the dynamic discovery component. At step 520, the dynamic discovery component checks proxy data that may pertain to the requester by checking proxy data store 460. Proxy data includes any grace period data that may apply to a given requester. A determination is made as to whether the requester is in the proxy list (decision 530). If the requester is not in the proxy list, decision 530 branches to "no" branch 535 whereupon, at step 540, the request is forwarded to the software application resource on behalf of the requester. On the other hand, if the requester is in the proxy list, decision 530 branches to "yes" branch 545 whereupon a determination is made as to whether the grace period for the requester has expired by comparing the current time/date to the grace expiration period set in the proxy data (decision 550). If the grace period has expired, decision 550 branches to "yes" branch 555 whereupon, at step 560, an error message is returned to the requester. On the other hand, if the grace period has not expired, decision 550 branches to "no" branch 565 whereupon, at step 570, the request is forwarded from the dynamic discovery component to software application resource 120 on behalf of the requester. The software application resource will accept the request because it is being requested by the dynamic discovery component (a privileged requester) and not by the requester.

At step 580, a response is received by the dynamic discovery component from software application resource 120 in response to the software application resource processing the request. At step 590, the received response is forwarded to the requester. Processing thereafter ends at 595.

Figure 6:
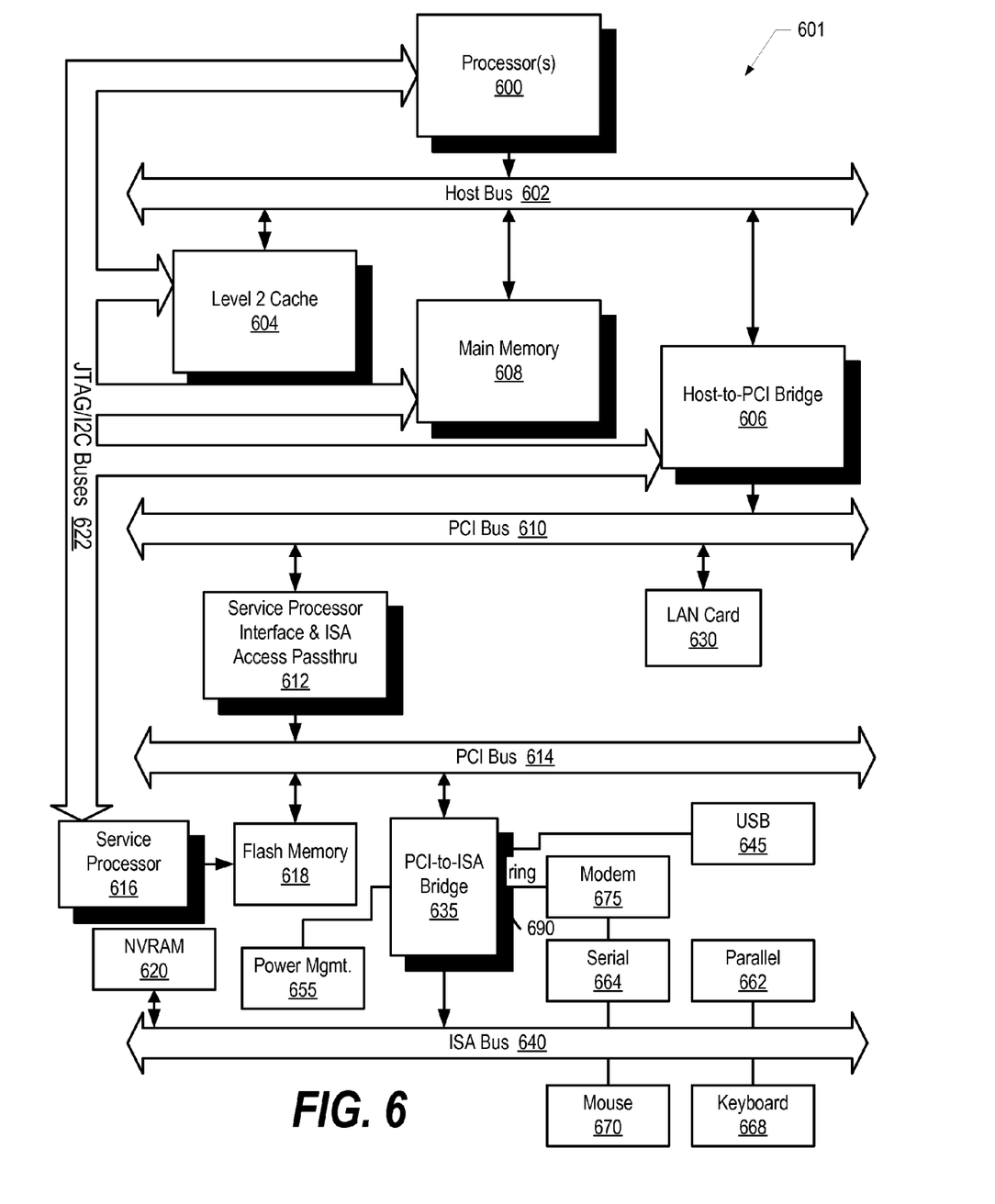
FIG. 6 is a block diagram of an information processing system capable of performing the computations contemplated in the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640. Real-time clock (RTC) 660 is also connected as a peripheral device and is used by the information handling system to perform timing operations.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the invention described herein, this computer system is simply one example of a computer system. Those skilled in the art will appreciate that many other computer system designs are capable of performing the invention described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   selecting a plurality of requestors that are requestors of a software application resource, wherein access to the software application resource is restricted, and wherein the selecting further comprises:
      prioritizing the requestors into a plurality of groups, wherein the prioritizing is based upon one or more priority group parameters, wherein at least one of the priority group parameters is selected from the group consisting of a connection frequency, a last connection timestamp, and a priority setting; and
      sequentially selecting, by an information handling system, each of the groups of requestors based upon the priority of the group, wherein the selected group is the plurality of selected requestors;
   requesting, from a privileged requestor, login security data pertaining to the selected requestors from the software application resource;
   receiving, at the privileged requestor, the requested login security data corresponding to the selected requestors;
   comparing the login security data for each selected requestor to one or more action parameters; and
   performing, by the privileged requestor, one or more actions for at least one of the selected requestors in response to the comparison.

2. The method of claim 1 wherein the software application resource is a database management system and wherein the requestors are selected from a group consisting of users, software applications, and software application servers.

3. The method of claim 1 wherein the action performed for at least one of the requestors (a grace period requestor) is a grace period setting, the method further comprising:
   establishing a grace period for the grace period requestor based upon the grace period setting;
   receiving, at the privileged requestor, a request from the grace period requestor after the grace period has been established;
   forwarding the request from the privileged requestor to the software application resource;
   receiving, at the privileged requestor, a response from the software application resource; and relaying the response from the privileged requestor to the grace period requestor.

4. The method of claim 3 further comprising:
determining whether the grace period has expired in response to receiving the request, wherein the forwarding, receiving, and relaying are only performed if the grace period is not expired.

5. The method of claim 1 wherein the action performed for at least one of the requestors (an updated requestor) is an automatic security setting update, the method further comprising:
sending, on behalf of the updated requestor, a security update request from the privileged requestor to the software application resource;
receiving, at the software application resource, the security update request; and
updating, at the software application resource, the updated requestor's security setting in response to receiving the security update request.

6. The method of claim 5 further comprising:
sending, from the software application resource to the privileged requestor, password update data resulting from the updating; and
forwarding, from the privileged requestor to the updated requestor, the password update data.

7. The method of claim 1 wherein the action performed for at least one of the requestors selected from the plurality of requestors is a notification, the method further comprising:
sending a message to a notified user, wherein the message indicates that the selected requestor's access to the software application resource is about to expire.

8. An information handling system comprising:
one or more processors;
one or more network adapters connecting the information handling system to a computer network;
a memory accessible by the processors;
a nonvolatile storage area accessible by the processors;
a process operated by the processors for managing access to a software application resource, the process being effective to:
select a plurality of requestors that are requestors of a software application resource, wherein access to the software application resource is restricted, wherein the process to select is further effective to:
prioritizing the requestors into a plurality of groups, wherein the prioritizing is based upon one or more priority group parameters, wherein at least one of the priority group parameters is selected from the group consisting of a connection frequency, a last connection timestamp, and a priority setting; and
sequentially selecting, by a processor, each of the groups of requestors based upon the priority of the group, wherein the selected group is the plurality of selected requestors;
request, from a privileged requestor, login security data pertaining to the selected requestors from the software application resource;
receive, at the privileged requestor, the requested login security data corresponding to the selected requestors;
compare the login security data for each selected requestor to one or more action parameters; and
perform, by the privileged requestor, one or more actions for at least one of the selected requestors in response to the comparison.

9. The information handling system of claim 8 wherein the action performed for at least one of the requestors (a grace period requestor) is a grace period setting, and wherein the process is further effective to:
establish a grace period for the grace period requestor based upon the grace period setting;
receive, at the privileged requestor, a request from the grace period requestor after the grace period has been established;
forward the request from the privileged requestor to the software application resource;
receive, at the privileged requestor, a response from the software application resource; and
relay the response from the privileged requestor to the grace period requestor.

10. The information handling system of claim 8 wherein the action performed for at least one of the requestors (an updated requestor) is an automatic security setting update, wherein the process is further effective to:
send, on behalf of the updated requestor, a security update request from the privileged requestor to the software application resource;
receive, at the software application resource, the security update request; and
update, at the software application resource, the updated requestor's security setting in response to receiving the security update request.

11. The information handling system of claim 8 wherein the action performed for at least one of the requestors selected from the plurality of requestors is a notification, wherein the process is further effective to:
send a message to a notified user, wherein the message indicates that the selected requestor's access to the software application resource is about to expire.

12. A computer program product stored in a computer readable medium, comprising functional descriptive material that, when executed by a data processing system, causes the data processing system to perform events that include:
selecting a plurality of requestors that are requestors of a software application resource, wherein access to the software application resource is restricted, wherein the selecting further comprises:
prioritizing the requestors into a plurality of groups, wherein the prioritizing is based upon one or more priority group parameters, wherein at least one of the priority group parameters is selected from the group consisting of a connection frequency, a last connection timestamp, and a priority setting; and
sequentially selecting, by a processor, each of the groups of requestors based upon the priority of the group, wherein the selected group is the plurality of selected requestors;
requesting, from a privileged requestor, login security data pertaining to the selected requestors from the software application resource;
receiving, at the privileged requestor, the requested login security data corresponding to the selected requestors;
comparing the login security data for each selected requestor to one or more action parameters; and
performing, by the privileged requestor, one or more actions for at least one of the selected requestors in response to the comparison.

13. The computer program product of claim 12 wherein the software application resource is a database management system and wherein the requestors are selected from a group consisting of users, software applications, and software application servers.

14. The computer program product of claim 12 wherein the action performed for at least one of the requestors (a grace period requestor) is a grace period setting, the computer program product further comprising functional descriptive material that, when executed by a data processing system, causes the data processing system to perform events that include:

establishing a grace period for the grace period requestor based upon the grace period setting;

receiving, at the privileged requestor, a request from the grace period requestor after the grace period has been established;

forwarding the request from the privileged requestor to the software application resource;

receiving, at the privileged requestor, a response from the software application resource; and relaying the response from the privileged requestor to the grace period requestor.

15. The computer program product of claim 14 further comprising functional descriptive material that, when executed by a data processing system, causes the data processing system to perform events that include:

determining whether the grace period has expired in response to receiving the request, wherein the forwarding, receiving, and relaying are only performed if the grace period is not expired.

16. The computer program product of claim 12 wherein the action performed for at least one of the requestors (an updated requestor) is an automatic security setting update, the computer program product further comprising functional descriptive material that, when executed by a data processing system, causes the data processing system to perform events that include:

sending, on behalf of the updated requestor, a security update request from the privileged requestor to the software application resource;

receiving, at the software application resource, the security update request; and updating, at the software application resource, the updated requestor's security setting in response to receiving the security update request.

17. The computer program product of claim 16 further comprising functional descriptive material that, when executed by a data processing system, causes the data processing system to perform events that include:

sending, from the software application resource to the privileged requestor, password update data resulting from the updating; and forwarding, from the privileged requestor to the updated requestor, the password update data.

18. The computer program product of claim 12 wherein the action performed for at least one of the requestors selected from the plurality of requestors is a notification, the computer program product further comprising functional descriptive material that, when executed by a data processing system, causes the data processing system to perform events that include:

sending a message to a notified user, wherein the message indicates that the selected requestor's access to the software application resource is about to expire.

* * * * *